137-13 SR
10/7/85 XR 4,615,352

United States Patent [19]
Gibot

[11] Patent Number: 4,615,352
[45] Date of Patent: Oct. 7, 1986

[54] PROCESS AND APPARATUS FOR SUPPLYING A MIXTURE OF $CO_2$ AND $SO_2$ OR A LIKE MIXTURE UNDER PRESSURE

[75] Inventor: Claude Gibot, Malakoff, France

[73] Assignee: Carboxyque Francaise, Paris, France

[21] Appl. No.: 733,780

[22] Filed: May 14, 1985

[30] Foreign Application Priority Data

May 17, 1984 [FR] France ................ 84 07630

[51] Int. Cl.[4] ................ G05D 11/00

[52] U.S. Cl. ................ 137/7; 137/88; 137/891; 137/892; 137/13

[58] Field of Search ................ 137/891, 892, 895, 7, 137/12, 13, 88, 90

[56] References Cited

U.S. PATENT DOCUMENTS

| | | | |
|---|---|---|---|
| 3,298,383 | 1/1967 | Cooper | 137/88 |
| 3,507,626 | 4/1970 | Van Horn | 137/892 |
| 3,721,253 | 3/1973 | Renke | 137/7 |
| 3,799,195 | 3/1974 | Hermans | 137/891 |
| 3,841,344 | 10/1974 | Slack | 137/7 |
| 4,023,587 | 5/1977 | Dobritz | 137/88 |
| 4,111,637 | 9/1978 | Hillman, II | 137/7 |
| 4,257,438 | 3/1981 | Miller | 137/88 |
| 4,349,358 | 9/1982 | Tarancon | 137/7 |

FOREIGN PATENT DOCUMENTS 3135510 3/1983 Fed. Rep. of Germany .

*Primary Examiner*—A. Michael Chambers
*Attorney, Agent, or Firm*—Young & Thompson

[57] ABSTRACT

The gaseous $CO_2$ is supplied at a pressure of 10 bars and at a constant rate of flow to the primary inlet (3) of an aspiration device (1). Gaseous $SO_2$ coming from a cylinder (24) which is heated and contains liquid $SO_2$ is conducted through a heated line (4) provided with an adjustable flow meter (27) to the secondary inlet (5) of the aspiration device. The mixture issuing from the latter is injected into a buffer tank (6) whose pressure is regulated at a value higher than the pressure of utilization and is drawn from this buffer tank when utilized. Applications in the supplying of mixtures for hardening sand moulds or cores to foundries of medium size.

17 Claims, 2 Drawing Figures

Figure 1:
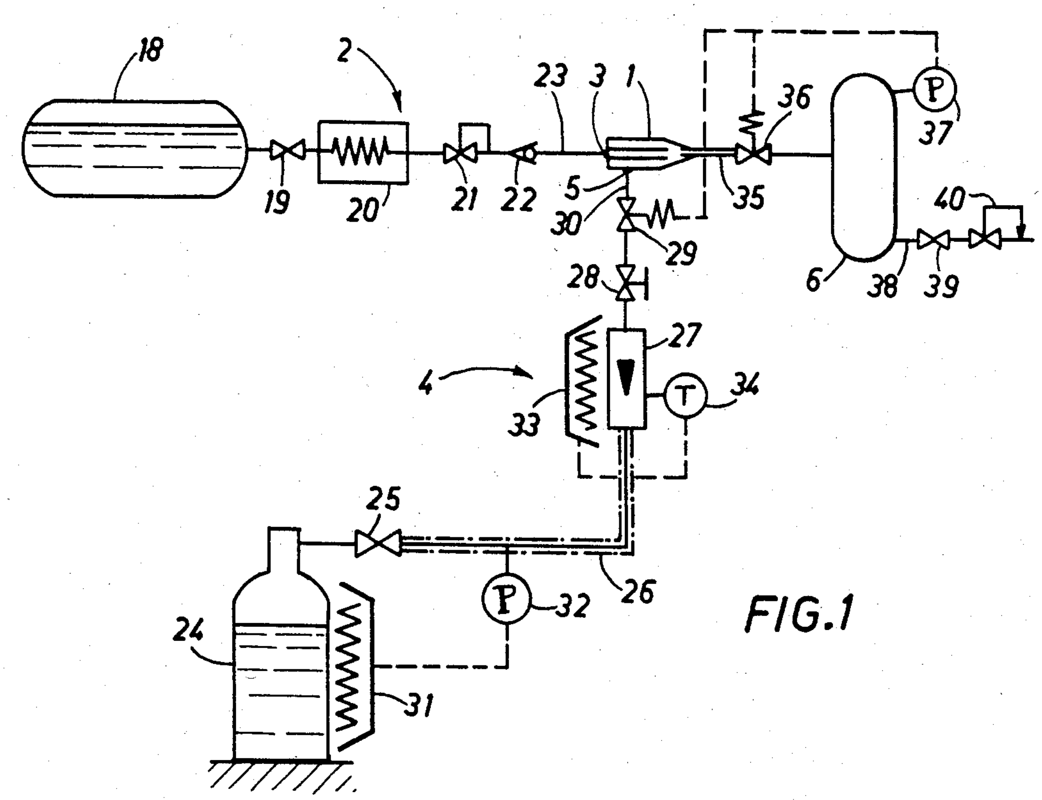

PROCESS AND APPARATUS FOR SUPPLYING A MIXTURE OF $CO_2$ AND $SO_2$ OR A LIKE MIXTURE UNDER PRESSURE

The present invention relates to a process and an apparatus for supplying under pressure a mixture of a first gas and a second gas having at ambient temperature an insufficient saturated vapour pressure and in particular a $CO_2$—$SO_2$ mixture. It is more particularly applicable to the supplying to foundries of medium size of mixtures for hardening sand moulds or cores.

The moulding processes employing the hardening of sand cores or moulds by means of a $CO_2$—$SO_2$ (carbon dioxide-sulphur dioxide) mixture are at the present time developing owing to their great advantages (very good surface condition of the cores or moulds, improved working atmosphere in the workshops).

For small foundries, there are employed cylinders of the $CO_2$—$SO_2$ mixture in the liquid phase, but this solution is no longer economically acceptable when the required flows of mixture become relatively great.

For large foundries, which for example require instaneous flows of mixture on the order of 20 $Nm^3/h$ (normal cubic metres per hour), liquid $SO_2$ is sprayed in a heated gaseous current of $CO_2$, a buffer tank is filled with the gaseous mixture at a regulated pressure higher than the pressure of utilization, and the mixture is drawn from this buffer tank. This requires a liquid $SO_2$ pumping unit whose cost becomes prohibitive for lower rates of flow.

An object of the invention is to provide a solution which is well adapted to intermediate situations, i.e. to moderate rates of flow. In the case of $CO_2$—$SO_2$ mixtures, it is suitable for foundries consuming for example 7 $Nm^3/h$ of mixture in instantaneous maximum value.

The invention therefore provides a process for supplying under pressure a mixture of a first gas and a second gas having at ambient temperature an insufficient saturated vapour pressure, in particular a $CO_2$—$SO_2$ mixture, of the type comprising filling a buffer tank with the gaseous mixture under a regulated pressure higher than the pressure of utilization, and drawing off the mixture from said buffer tank, said method further comprising heating a vessel containing the second gas in the liquid form to a temperature which corresponds to a saturated vapour pressure slightly higher than the pressure of the buffer tank, and conveying the vapour thus formed to an aspiration device through which a current of the first gas travels under a distinctly higher pressure, said device being connected on the downstream side to the buffer tank.

Preferably, the rate of flow of the first gas is fixed and the rate of flow of the second gas is regulated so as to obtain the desired composition of the mixture.

The invention also provides an apparatus for carrying out said process. Said apparatus is of the type comprising means for achieving the mixture of the two gases, means for introducing the mixture in a buffer tank maintained at a regulated pressure higher than the pressure of utilization, a means for drawing off the mixture from said buffer tank, wherein the mixing means comprise: a source of the first gas under a pressure distinctly higher than the pressure of the buffer tank; a pipe connecting said source to the primary inlet of an aspiration device connected on the downstream side to the buffer tank; a vessel containing the second gas in a liquid form; a line connecting said vessel to the secondary inlet of the aspiration device; and means for heating said vessel.

Figure 2:
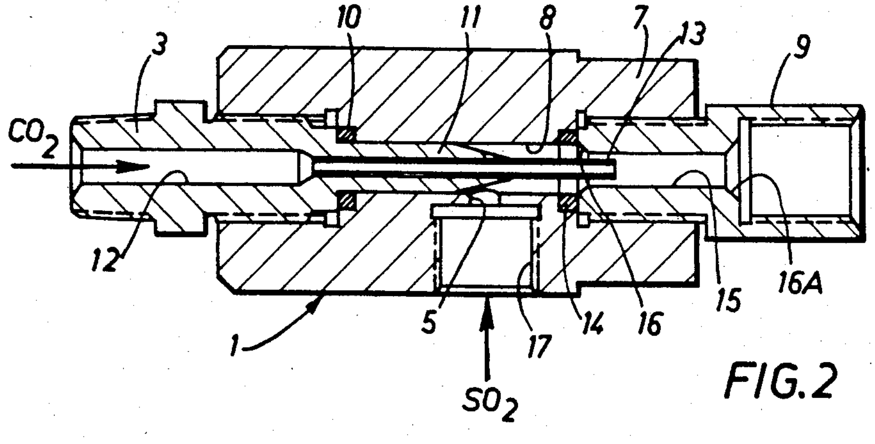

An embodiment of the invention will now be described with reference to the accompanying drawing in which:

FIG. 1 is a diagrammatic view of an apparatus according to the invention, and FIG. 2 is a longitudinal sectional view of the aspiration device of said apparatus.

The apparatus shown in FIG. 1 is adapted to supply to a foundry of medium size a $CO_2$—$SO_2$ mixture under pressure of 2.5 bars with an instantaneous rate of flow which may be as much as about 7 $Nm^3/h$. It mainly comprises an aspiration device 1, a line 2 supplying $CO_2$ to a primary inlet 3 of said device, a line 4 supplying gaseous $SO_2$ to a secondary inlet 5 of said device, and a buffer tank 6.

As can be seen in FIG. 2, the aspiration device 1 is of the venturi type. It comprises a body 7 provided with an axial bore 8, an inlet connector which constitutes the primary inlet 3 of the device, and an outlet connector 9.

The bore 8 is extended at each end by a tapped counterbore. The connector 3 is screwed into the inlet counterbore with interposition of an annular sealing element 10 and is extended by a nose portion 11 guided in the bore 8. The end of this nose portion forms a point and an axial conduit 12 extends throughout the connector 3. A capillary tube 13 is fixed in the part of the conduit 12 located in the nose portion 11.

The connector 9 is screwed into the outlet counterbore with interposition of an annular sealing element 14. An axial conduit 15 extends through the connector 9 and has a convergent inlet 16 and a divergent outlet 16A and the diameter of this conduit 15 is intermediate between the diameter of the bore 8 and the outside diameter of the capillary tube 13. The downstream end of this tube extends into the main part of the conduit 15.

The downstream end of the connector 9 is, in the same way as the upstream end of the connector 3, adapted to be fixed to the associated conduit of the apparatus.

The secondary inlet 5 of the aspiration device 1 is formed by a radial orifice in the body 7 which communicates with the bore 8 in confronting relation to the point of the nose portion 11 of the connector 3. This orifice 5 communicates at the upstream end thereof with a tapped counterbore 17 in which is fixed the downstream end of the line 4 supplying $SO_2$.

The line 2 supplying $CO_2$ comprises in succession, from the upstream end to the downstream end: a tank 18 of liquid $CO_2$ under a pressure on the order of 20 bars; a stop cock 19 interposed between this tank and a vaporizer 20; a pressure relief valve 21 which brings the pressure of the vaporized $CO_2$ to 10 bars; a calibrated check valve 22; and a final pipe section 23 connected to the connector 3 of the aspiration device 1.

The line 4 supplying $SO_2$ comprises in succession, from the upstream end to the downstream end: a cylinder 24 of liquid $SO_2$; a stop cock 25; a pipe 26 provided with electric heating resistors; a flow meter 27; a flow regulating valve 28; an electrically-operated valve 29; and a final pipe section 30 connected to the counterbore 17 of the aspiration device 1.

A device 31 for heating by radiation is associated with the cylinder 24 and controlled by a pressure detector or controller 32 which measures the pressure prevailing in the pipe 26.

Another radiating heating device 33 is associated with the flow meter 27 and controlled by a temperature detector or thermostat 34 which measures the temperature of this flow meter.

A pipe section 35 provided with an electrically-operated valve 36 is connected between the outlet connector 9 of the device 1 and an inlet of the buffer tank 6. A pressure detector or controller 37 associated with the latter controls the two electrically-operated valves 29 and 36 simultaneously. A drawing off pipe 38 including a stop cock 39 and a pressure regulator 40 leads to the mixture utilization station.

For the purpose of describing the operation of this apparatus, it will be assumed that the pressure of the buffer tank 6 is higher than the set low pressure of the detector 37 which is for example 3 bars for the utilization of the mixture (downstream of the regulator 40) at 2.5 bars. The valves 29 and 36 are maintained closed by the detector 37 and the mixture is drawn off through the pipe 38.

When the pressure of the buffer tank reaches the low set value, the detector 37 opens the valves 29 and 36 simultaneously. The gaseous $CO_2$ arrives in the primary inlet 3 of the aspiration device 1 at a pressure of 10 bars and flows through the capillary tube 13 which imparts thereto a predetermined constant rate of flow. The current of $CO_2$ flowing at high velocity through the venturi formed by the conduit 15 of the connector 9, aspirates gaseous $SO_2$ through the orifice 5 at a rate of flow regulated by the valve 28 and measured by the flow meter 27. The mixture is achieved in the venturi and injected into the buffer tank 6 through the pipe 35.

The pressure of the gaseous $SO_2$ is regulated at a value which exceeds by 0.5 bar the set high pressure of the buffer tank, namely $3.5+0.5=4$ bars. This pressure is obtained by heating the cylinder 24 to the temperature corresponding to a saturated vapour pressure of 4 bars. For this purpose, the detector 32 brings into action the heating device 31 when the pressure in the pipe 26 reaches its set low value of 4 bars and stops this device when this pressure reaches its set high value of 4.5 bars. The saturated vapour thus produced is superheated in the pipe 26 by the electric resistors with which this pipe is provided, and in the flow meter 27 by the heating device 33 so as to ensure that it is monophase $SO_2$ which reaches the aspiration device 1. The set high and low values of the detector 34 are respectively 80° C. and 70° C. At the outlet of the device 1, the partial pressure of the $SO_2$ is too low to involve a risk of recondensation and no heating of the pipe 35 is therefore necessary.

Thus a current of $CO_2$—$SO_2$ mixture having a given composition, for example with 10% of $SO_2$, is Sinected at a substantially constant rate of flow into the buffer tank 6 and increases the pressure in the latter. When this pressure reaches the set high value of the detector 37, namely 3.5 bars, this detector causes the simultaneous closure of the electrically-operated valves 29 and 36.

Experience has shown that there is in this way obtained in an economical manner from a single cylinder of liquid $SO_2$, a precise mixture with a mean rate of flow which may be variable with respect to time. It will be understood that the invention is applicable whenever it is desired to supply a mixture under pressure of a vector gas, for example an inert gas, and a gas, for example an active gas whose saturated vapour pressure at the ambient temperature is too low to permit a direct drawing off of the vapour (that of $SO_2$ at 15° C. is only 1.8 bar) and which is stored in the form of a liquid.

What is claimed is:

1. A process for supplying at a given pressure of utilization a mixture of a first gas and a second gas which is unsaturated at ambient temperature, comprising filling a buffer tank with the gaseous mixture under a regulated pressure higher than said pressure of utilization, and drawing said mixture from said buffer tank, said process further comprising heating a vessel containing the second gas in a liquid form to a temperature which corresponds to a saturated vapour pressure slightly higher than the pressure in the buffer tank, and conveying the vapour thus formed into a secondary inlet of an aspiration device through a primary inlet of which a current of the first gas is made to flow t a pressure distinctly higher than said pressure in the buffer tank, said aspiration device being connected on a downstream side thereof to the buffer tank.

2. A process according to claim 1, wherein said mixture is a $CO_2$—$SO_2$ mixture.

3. A process according to claim 1, wherein said first gas is $CO_2$ and said second gas is $SO_2$.

4. A process according to claim 1, comprising also heating a line conveying the second gas from the vessel to the aspiration device.

5. A process according to claim 1, comprising fixing the rate of flow of the first gas and regulating the rate of flow of the second gas so as to obtain the desired composition of the mixture.

6. A process according to claim 4, comprising fixing the rate of flow of the first gas and regulating the rate of flow of the second gas so as to obtain the desired composition of the mixture.

7. An apparatus for carrying out a process for supplying at a given pressure of utilization a mixture of a first gas and a second gas which is unsaturated at ambient temperature, said apparatus comprising a buffer tank, means for mixing the two gases, means for introducing said mixture into the buffer tank, means for maintaining the interior of the buffer tank at a regulated pressure higher than said pressure of utilization, and means for drawing off the mixture from said buffer tank, said mixing means comprising: an aspiration device having a primary inlet and a secondary inlet, a source of the first gas under a pressure distinctly higher than the pressure in the buffer tank; a pipe connecting said source to the primary inlet of the aspiration device, the aspiration device being connected on a downstream side thereof to the buffer tank; a vessel containing the second gas in the form of a liquid; a line connecting an upper portion of said vessel to the secondary inlet of the aspiration device; and means for heating said vessel whereby vapor produced by said heating flows through said line to said secondary inlet.

8. An apparatus according to claim 7, wherein the aspiration device comprises a venturi.

9. An apparatus according to claim 7, further comprising means for heating said line.

10. An apparatus according to claim 8, further comprising means for heating said line.

11. An apparatus according to claim 7, wherein the primary inlet of the aspiration device comprises a capillary tube and said line is provided with an adjustable flow meter.

12. An apparatus according to claim 8, wherein the primary inlet of the aspiration device comprises a capillary tube and said line is provided with an adjustable flow meter.

13. An apparatus according to claim 9, wherein the primary inlet of the aspiration device comprises a capillary tube and said line is provided with an adjustable flow meter.

14. An apparatus according to claim 10, wherein the primary inlet of the aspiration device comprises a capillary tube and said line is provided with an adjustable flow meter.

15. An apparatus according to claim 11, comprising a detector of the temperature of the flow meter, and means for heating the flow meter and associated with the detector so as to be regulated by the detector.

16. An apparatus according to claim 7, comprising a detector of the pressure in said line, said pressure detector being associated with the means for heating said vessel so as to regulate said means for heating said vessel.

17. An apparatus according to claim 7, comprising a first electrically-operated valve inserted in said line, a second electrically-operated valve inserted between said aspiration device and said buffer tank, and a detector of the pressure prevailing in said buffer tank, said pressure detector being adapted to selectively open and close the two electrically-operated valves simultaneously.

* * * * *